(12) United States Patent
Stegerer et al.

(10) Patent No.: US 10,399,537 B2
(45) Date of Patent: Sep. 3, 2019

(54) ADJUSTING DEVICE FOR A SAFETY BELT WITH AN EXTENDABLE BELT GUIDING ELEMENT

(71) Applicant: Brose Fahrzeugteile GmbH & Co. KG, Coburg, Coburg (DE)

(72) Inventors: Mario Stegerer, Gundelsheim (DE); Michael Hoeppel, Bad Staffelstein (DE); Markus Bauernfeind, Coburg (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 302 days.

(21) Appl. No.: 15/302,149

(22) PCT Filed: Apr. 10, 2015

(86) PCT No.: PCT/EP2015/057857
§ 371 (c)(1),
(2) Date: Jan. 25, 2017

(87) PCT Pub. No.: WO2015/155337
PCT Pub. Date: Oct. 15, 2015

(65) Prior Publication Data
US 2017/0129449 A1 May 11, 2017

(30) Foreign Application Priority Data
Apr. 11, 2014 (DE) .................. 10 2014 207 036

(51) Int. Cl.
*B60R 22/03* (2006.01)
*B60R 22/20* (2006.01)
*B60R 22/18* (2006.01)

(52) U.S. Cl.
CPC .............. *B60R 22/20* (2013.01); *B60R 22/03* (2013.01); *B60R 2022/1818* (2013.01); *B60R 2022/207* (2013.01); *B60R 2022/208* (2013.01)

(58) Field of Classification Search
CPC ... B60R 22/03; B60R 22/20; B60R 2022/207; B60R 2022/208; B60R 2022/1818
(Continued)

(56) References Cited

U.S. PATENT DOCUMENTS

| 2003/0230885 A1 | 12/2003 | Wittenberg |
| 2009/0302593 A1 | 12/2009 | Grau et al. |
| 2010/0181819 A1 | 7/2010 | Birk et al. |

FOREIGN PATENT DOCUMENTS

| DE | 3744578 A1 * | 7/1989 | ............ B60R 22/03 |
| DE | 10204940 A1 | 9/2003 | |

(Continued)

OTHER PUBLICATIONS

Japanese Notification of Reasons for Rejection dated Dec. 25, 2018 cited in corresponding JP Application No. 2016-561645, 4 pages, with English translation, 4 pages.

*Primary Examiner* — Keith J Frisby
(74) *Attorney, Agent, or Firm* — Lewis Roca Rothgerber Christie LLP

(57) ABSTRACT

An adjusting device for a safety belt in a vehicle comprises at least one extendable belt guiding element which is provided for guiding a portion of the safety belt and at least one supporting element which is connected to the belt guiding element and which is able to be at least partially extended together with the belt guiding element. The belt guiding element is able to be extended from a resting position in a direction of extension in order to facilitate the grasping of the safety belt by a vehicle occupant when fastening the safety belt. The supporting element is flexible but in the extended state of the belt guiding element is sufficiently rigid (Continued)

at least in one portion transversely to the direction of extension such that the belt guiding element is held in an extended position via the now rigid portion of the supporting element.

9 Claims, 4 Drawing Sheets

(58) Field of Classification Search
USPC .................................. 280/801.2; 297/481
See application file for complete search history.

(56) References Cited

FOREIGN PATENT DOCUMENTS

| | | |
|---|---|---|
| DE | 10 2004 006 465 A1 | 8/2005 |
| DE | 10 2004 036 189 A1 | 3/2006 |
| DE | 10 2008 026 872 A1 | 12/2009 |
| DE | 10 2009 005 205 A1 | 7/2010 |
| DE | 10 2009 009 906 A1 | 8/2010 |
| DE | 102009009906 A1 * | 8/2010 |
| DE | 10 2011 112 992 A1 | 6/2012 |
| EP | 1 827 922 A1 | 9/2007 |
| JP | 62-110546 A | 5/1987 |
| JP | 10-194081 A | 7/1998 |
| WO | WO 2006/010484 A1 | 2/2006 |
| WO | WO 2006/052186 A1 | 5/2006 |

* cited by examiner

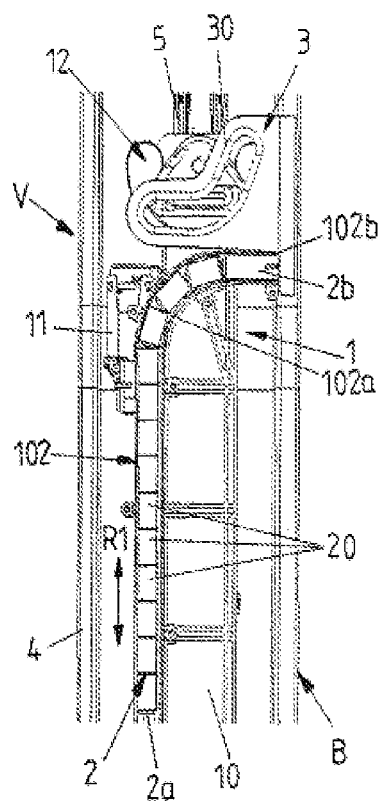
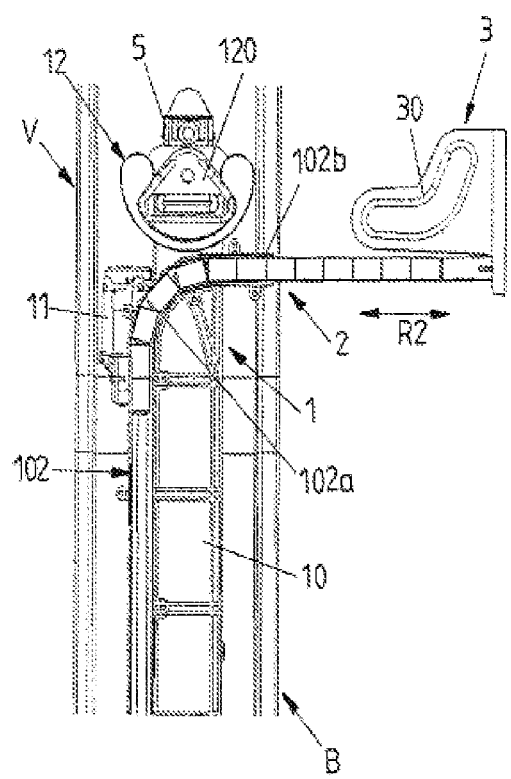
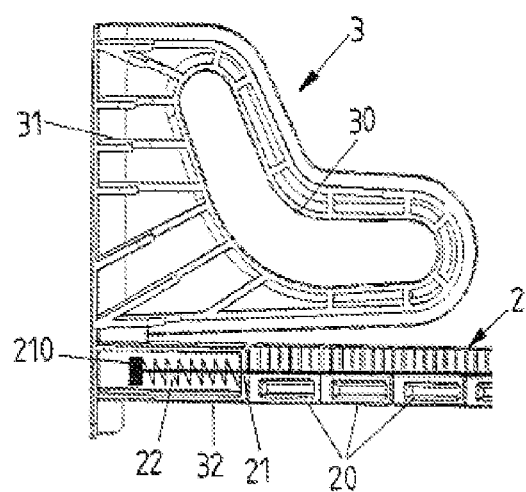

ADJUSTING DEVICE FOR A SAFETY BELT WITH AN EXTENDABLE BELT GUIDING ELEMENT

CROSS-REFERENCE TO A RELATED APPLICATION

This application is a National Phase Patent Application of International Patent Application Number PCT/EP2015/057857, filed on Apr. 10, 2015, which claims priority of German Patent Application Number 10 2014 207 036.8, filed on Apr. 11, 2014, the entire contents of all of which are hereby incorporated by reference.

BACKGROUND

The present invention relates to an adjusting device for a safety belt in a vehicle.

Such an adjusting device comprises at least one belt guiding element which is provided for the guidance of a portion of the safety belt. The belt guiding element in this case is designed to be extendable in order to facilitate the grasping of the safety belt, for example on an insertion tongue for a belt buckle, by a vehicle occupant when fastening the safety belt. The adjusting device may be designed, therefore, as a so-called belt extender in order to displace to the front a portion of the safety belt to be grasped by a vehicle occupant before fastening the safety belt. Generally, such adjusting devices are arranged on a vehicle part fixed to the bodywork, for example in the region of the B-pillar of a motor vehicle, or on a seat part of a vehicle seat, for example in or on the backrest.

An adjusting device comprising a belt guiding element for a safety belt is disclosed in DE 10 2004 036 189 A1, in which the belt guiding element in the extended state is retained via a supporting element designed in the manner of a link chain. Via the individual chain links the supporting element per se is flexible. In the extended state, however, the individual chain links are fixed together such that the chain is rigid transversely to a direction of extension of the belt guiding element and retains the belt guiding element in a desired position. In DE 10 2004 036 189 A1, in this case the supporting element which is designed as a link chain is able to be pivoted in the extended state in a targeted manner via a traction cable in order to be able to extend the belt guiding element on a backrest substantially upwardly and to pivot said belt guiding element to the front. To this end, in a retracted state in which the belt guiding element is in a resting position, the link chain is arranged so as to extend in a linear manner inside a guide channel. After the link chain has been extended sufficiently far along a channel longitudinal axis, it is then pivoted and bent in a curved manner.

The adjusting device proposed in DE 10 2004 036 189 A1 requires a relatively large amount of constructional space and is not suitable for arranging on a B-pillar of a motor vehicle. Thus when attached to the B-pillar, a belt guiding element has to be displaced primarily to the front and not upwardly. In the direction of extension which extends transversely to the direction of extension of the B-pillar, there is generally insufficient constructional space available in order to accommodate a guide channel extending in a linear manner in the direction of extension, as is provided in DE 10 2004 036 189 A1. Additionally, the adjusting device disclosed in DE 10 2004 036 189 A1 does not provide any possibility of adjusting a position of the belt guiding element after a vehicle occupant has fastened the safety belt.

Moreover, an adjusting device designed as a belt extender is disclosed in DE 10 2009 009 906 A1, said adjusting device also having a supporting element configured as a multi-link feed chain in order to displace a portion of a safety belt by extending the feed chain from a housing, such that said safety belt may be easily grasped by a vehicle occupant for fastening the safety belt. In order to require less constructional space for mounting the feed chain which is rigid only in the extended state, a guide for the feed chain is provided inside the housing, said feed chain being deflected repeatedly in said guide.

In DE 10 2009 009 906 A1, the feed chain is used for displacing a belt portion which is no longer coupled to the adjusting device after fastening the safety belt. Accordingly, DE 10 2009 009 906 A1 also does not provide any further possibility of adjusting the positioning of a belt guiding element. Instead, in this case via the design of a retaining arm which is able to be extended via the feed chain it is ensured that the portion of the safety belt is displaced to the front substantially independently of the current position of the unused safety belt and then may be easily grasped substantially independently of the size and seating position of a vehicle occupant located on an assigned vehicle seat.

SUMMARY

Proceeding therefrom, the object of the present invention is to provide an improved adjusting device for a belt extender by which not only the fastening of the safety belt of a vehicle occupant is able to be facilitated but also a position of a belt guiding element may be still adapted after a vehicle occupant has fastened the safety belt. Additionally, to this end the adjusting device should require little constructional space so that it may be accommodated, in particular, in a B-pillar of a motor vehicle.

This object is achieved by an adjusting device as described herein.

In an adjusting device according to the invention at least one belt guiding element which is provided for guiding a portion of the safety belt is designed to be extendable, wherein at least one supporting element which is connected to the belt guiding element is able to be at least partially extended together with the belt guiding element, and retains the belt guiding element in an extended position. The supporting element in this case is designed to be flexible per se, for example in the form of a link chain so that it may be mounted in a compact manner. At the same time, however, the supporting element is designed such that it is sufficiently rigid in an extended state of the belt guiding element on an extended portion in order to retain the belt guiding element in an extended position.

In the solution according to the invention, moreover, an adjustable belt guiding subassembly is provided for the mounting of the extendable belt guiding element. In this case the belt guiding subassembly of an adjusting device according to the invention is able to be adjusted in a direction of adjustment which is different from the direction of extension of the belt guiding element in order to provide a variable resting position to the belt guiding element by adjusting the belt guiding subassembly, it then being able to be extended from said position and/or it being able to be retracted into said position. Additionally, the supporting element is deflected at least once on the adjustable belt guiding subassembly when the belt guiding element is in its resting position. In this manner, the supporting element is mounted in a compact manner and is always adjusted therewith when the resting position of the belt guiding element is altered via the belt guiding subassembly.

In this manner, in particular, the extension of the belt guiding element may take place independently of the current adjusting position of the belt guiding subassembly and the resting position of the belt guiding element and/or the position of the belt guiding element in its extended state may be adjusted by a user separately via the belt guiding subassembly.

In one variant, it may accordingly be provided that the retraction and extension of the belt guiding element may be undertaken independently of an adjustment of the belt guiding subassembly. In this case, for example, the belt guiding subassembly may be adjusted irrespective of whether the belt guiding element is retracted or extended. Thus, for example, an adjustment of the belt height may be undertaken by the adjustment of the belt guiding subassembly even when the belt guiding element is extended.

Preferably, via an adjusted position of the belt guiding subassembly the position, in particular the height, of a deflection point for the safety belt is predetermined, the safety belt extending from said deflection point in the direction of the shoulder of a vehicle occupant who is fastened in by the safety belt. Via the belt guiding subassembly, therefore, an upper deflection point for the safety belt in the shoulder region of a vehicle occupant is predetermined when the belt guiding element is again located in its resting position and, in particular, when the vehicle occupant is fastened in by the safety belt.

In one exemplary embodiment, the belt guiding element accordingly also serves for guiding a portion of the safety belt in the region of a shoulder of a vehicle occupant fastened in by the safety belt. As a result, the belt guiding element in this case not only undertakes the displacement of a portion of the safety belt in order to make this safety belt easier for a vehicle occupant to be able to grasp but also provides a guide for the safety belt when the vehicle occupant has fastened the safety belt and the belt guiding element is once again in its resting position. As a result, in such an exemplary embodiment, just one belt guiding element is able to be extended for facilitating the fastening of the safety belt, the safety belt remaining guided thereon even after the safety belt has been fastened.

For the compact design of the adjusting device the flexible support element is deflected on the belt guiding subassembly at least once by at least 60°, preferably at least once by substantially 90°. Thus the supporting element, for example when accommodated on a B-pillar of a motor vehicle, extends in the resting position of the belt guiding element principally substantially in the direction of extension of the B-pillar, whilst as a result of the deflection of the supporting element the belt guiding element on the B-pillar may be extended to the front substantially perpendicular thereto.

The flexible supporting element may be mounted on a guide of the belt guiding subassembly such that the supporting element protrudes from an outlet opening of the guide, at least with a now rigid portion, when the belt guiding element is (partially or fully) extended. The supporting element, therefore, in the extended state is self-supporting in order to retain the belt guiding element in an extended position. The guide may in this case be configured, for example, as a channel which is closed or at least open on one side on an adjusting part of the belt guiding subassembly. The adjusting part in this case may be adjustable along an adjustment axis extending substantially perpendicular to the direction of extension, in order to be able to adjust a belt height for the safety belt.

In one variant it is provided that the belt guiding subassembly is able to be adjusted by means of the supporting element in the direction of adjustment. The supporting element in this case, therefore, serves not only for the extension of the belt guiding element in the direction of extension but is also used to adjust the belt guiding subassembly in the direction of adjustment. In this case, in the retracted state the supporting element may be able to transmit an adjusting force to an adjusting part of the belt guiding subassembly preferably without having to extend the belt guiding element at the same time. Thus the flexible supporting element may be mounted so as to be extendable on a guide of the adjusting part of the belt guiding subassembly and the adjusting part may be coupled to a control mechanism, an adjusting force exerted via the flexible supporting element being able to be transmitted thereby to the adjusting part in order to adjust the adjusting part. Via the control mechanism, therefore, it is preferably possible to adjust whether an adjusting force applied to the supporting element—preferably by an actuator—leads to an adjustment of the supporting element together with the belt guiding subassembly in the direction of adjustment or to an extension of the supporting element together with the belt guiding element in the direction of extension.

Accordingly, in one exemplary embodiment it is provided that by means of the control mechanism an adjusting movement of the supporting element is able to be controlled such that
 an adjusting force exerted on the supporting element is able to be initially transmitted to the adjusting part in order to adjust the adjusting part and
 after the adjusting part has traveled over a predetermined adjustment path the supporting element is adjusted relative to the adjusting part in order to extend the belt guiding element in the direction of extension.

By means of the control mechanism, therefore, an adjusting force applied to the supporting element is (optionally) able to be used both for adjusting the belt guiding subassembly and for extending the belt guiding element. In this case, an adjusting force which is continuously applied may be converted via the control mechanism into different successive adjusting movements. Thus, initially an adjustment of the supporting element together with the adjusting part of the belt guiding subassembly and a subsequent adjustment of the supporting element relative to the adjusting part may be predetermined via the control mechanism.

In one development which is based thereon, the adjusting part is displaceably mounted in the direction of adjustment and the supporting element is able to be adjusted in its retracted state in the direction of adjustment and is deflected in the direction of extension via a deflection region provided in the guide of the adjusting part. The retracted supporting element is (initially) prevented from extending in the direction of extension by an adjustable stop of the control mechanism, so that the supporting element adjusted in the direction of adjustment displaces the adjusting part. Only when the stop is adjusted and the supporting element is no longer locked against an adjustment in the direction of extension, is an adjustment of the supporting element also permitted relative to the adjusting part and in the direction of extension in order to extend the belt guiding element.

In one variant, the control mechanism comprises a flexible control traction means, for example in the form of a traction cable. By means of the flexible control traction means, preferably an adjusting force is able to be transmitted to a component of the control mechanism.

In one exemplary embodiment, an adjusting force is able to be transmitted by means of the flexible control traction means in order to adjust the stop from a locked position, in which the stop locks the supporting element against an adjustment relative to the adjusting part in the direction of extension, into a released position, in which the stop does not lock the supporting element against such an adjustment. The control traction means in this case may be fixed to a guide part, the adjusting part being able to be adjusted relative thereto in the direction of adjustment, and fixed to the adjusting part, preferably via in each case one of its two ends. In this manner, with an adjustment of the adjusting part the control traction means is tensioned relative to the guide part and exerts thereby a tractive force on the stop. If the adjusting part has traveled over a defined adjustment path relative to the guide part, the tractive force exerted by the control traction means is increased to such an extent that it exceeds a restoring force of a spring element acting on the adjustable stop and thereby adjusts the stop against the restoring force into a released position.

Instead of such an automatic adjustment of the stop solely by the adjustment of the supporting element and the coupling of the adjusting part to the fixed guide part via the at least one flexible control traction means, naturally an adjustment of the stop between its locked position and its released position, applied by an external force, may also be provided without a mechanical coupling being required between the adjusting part and the guide part. For example, a specific (motorized) drive may be provided for the adjustment of the stop.

In one exemplary embodiment, in its resting position and when the supporting element is retracted, the belt guiding element is positively blocked on a fastening part. As a result, in this case the belt guiding element is in its resting position where, via the belt guiding element and when the vehicle occupant has fastened the safety belt, a portion of the safety belt is guided, is held in position via a positively locked connection with a preferably stationary fastening part and is optionally (additionally) supported.

In one possible development, the positive blocking is able to be released by adjusting the belt guiding element in the direction of adjustment. In this case, positively locked connecting regions or positively locked connecting elements on the belt guiding element and the fastening part are, therefore, able to be brought out of engagement by moving in the direction of adjustment, and are able to be brought into engagement with one another again when adjusting the belt guiding element counter to the direction of adjustment, in order to transfer the belt guiding element again into its resting position. In this manner, the belt guiding element only has to be displaced in the direction of adjustment in order to release a positively locked connection between the fastening part and the belt guiding element. A positively locked connection between the fastening part and the belt guiding element may also be configured such that the belt guiding element is fixed thereby in its resting position in the direction of extension. Conversely, via the positively locked connection, only one adjustment of the belt guiding element is preferably permitted in the direction of adjustment when the belt guiding element and the fastening part are connected together as intended. Thus a relative movement of the belt guiding element relative to the fastening part is not possible if the belt guiding element has not previously been adjusted in the direction of adjustment and a positively locked connection has not been released between the belt guiding element and the fastening part.

In one variant, the belt guiding subassembly is provided for mounting on a backrest of a vehicle seat. Similarly, a belt guiding subassembly may be provided for mounting on a B-pillar or C-pillar of a vehicle. In both cases, the adjusting device may be of modular design, so that the belt guiding subassembly together with the belt guiding element which is mounted to be extendable thereon and optionally with a drive for adjusting the belt guiding subassembly by an externally applied force and/or for extending the belt guiding element, forms a structural unit which is prefabricated and able to be pretested. In one exemplary embodiment, the adjusting device comprises an adjusting module with a belt guiding subassembly in which the supporting element, the belt guiding element connected thereto and an electromotive drive for adjusting the belt guiding element are mounted in an extendable manner on an adjusting part, and the adjusting part in turn is displaceably mounted on a guide part, wherein the adjusting module is mounted via the guide part or in a B-pillar or C-pillar of a motor vehicle.

In one exemplary embodiment, the belt guiding element forms a cladding portion, an outlet opening for the safety belt being at least partially covered thereby when the belt guiding element is in its resting position. In its resting position, therefore, the belt guiding element may form part of an external cladding in order to cover in a manner which is as aesthetically attractive as possible an outlet opening for the safety belt. Through the outlet opening the safety belt, for example, is guided from the interior of a hollow space on a B-pillar which is covered by cladding or a backrest of a vehicle seat.

In principle, the supporting element which is flexible per se in the extended state of the belt guiding element may be rigid due to partial elements connected together or due to its shape. Thus the supporting element may comprise, for example, a continuous strip or a chain with partial elements connected together in the form of a plurality of chain links. When using a strip, for example made of metal or made of a polymer material, the strip may be correspondingly shaped, for example with a corresponding curved portion transversely to its direction of longitudinal extent, so that it is pretensioned and is self-supporting in the extended state, as is known for example in the case of measuring tapes made from a spring steel. When using a chain, it is in turn provided that links of the chain are configured and arranged relative to one another such that in the extended state of the belt guiding element, links of the chain may be fixed together automatically via a positively locked connection and/or via a frictional connection.

The links of a chain have a limited freedom of movement so that, on the one hand, the chain may be deflected and, on the other hand, by the design of the individual links a positively locked or frictional connection of the links relative to one another is possible. Preferably, in this case in the extended state the links of the chain are connected together under tension such that they are no longer movable in at least one direction. The chain is thus rigid in this direction and holds the belt guiding element in position.

For fixing the links together, at least one magnet and/or an elongated traction means, for example a tensioning strap or traction cable, may be provided. One end of the traction means in this case is connected, for example, to the belt guiding element or a link of the chain fixed to the belt guiding element.

The traction means in this case preferably extends along the links of the chain and exerts a pretensioning on the individual links so that said links attempt to align themselves along an axis extending in a straight line and thereby to stiffen the chain.

Accordingly, it is provided in one exemplary embodiment that the links of a chain which is used are pretensioned relative to one another such that links of the chain in the extended state of the belt guiding element are fixed together in a chain portion and, via the chain portion which is made rigid thereby transversely to the direction of extension of the belt guiding element, the belt guiding element is held in its extended position, and when adjusting the belt guiding element into its resting position the fixing of the links together is able to be released so that the previously rigid chain portion becomes flexible again.

As explained above, this is achieved, for example, by a resilient mounting of a traction means end connected to the extendable belt guiding element. The other traction means end is then connected to a final chain link which is spaced apart to a maximum extent from the belt guiding element and fixed thereto. As a result, a pretensioning force is produced on the individual chain links, the traction means extending along and optionally through said chain links. In this manner, as a result of the pretensioning force which is applied, for example, via a compression spring mounted in a chain link or in or on the belt guiding element, the chain always attempts to run in a straight line. As a result, for example, in one portion the chain automatically becomes rigid and/or self-supporting, as soon as this portion protrudes from an outlet opening of a guide for the chain.

In one variant, the adjusting device comprises a drive, the extension of the belt guiding element and/or the adjustment of the adjustable belt guiding subassembly being able to take place thereby, by means of an externally applied force. Thus, in principle, it is also conceivable that a belt guiding element which is able to be extended, in particular able to be pulled out, manually is provided via an adjusting device according to the invention. As part of the enhanced comfort for a vehicle occupant, however, an adjusting device is preferable in which the belt guiding element is electronically controlled and is extended by an externally applied force by means of a drive motor. The adjustment of the belt guiding subassembly for adjusting a belt height may take place by an externally applied force and may be electronically controlled via the same drive or a further drive.

In this case in one exemplary embodiment the drive may act on the supporting element in order to extend the belt guiding element by an externally applied force and optionally also to retract said belt guiding element again. In this case, for example, individual chain links of a supporting element designed as a link chain may have in each case toothed regions on one outer face. Therefore, a drive pinion of the drive meshes with these toothed regions in order to adjust the link chain and to extend and retract the belt guiding element secured thereto.

BRIEF DESCRIPTION OF THE DRAWINGS

Further advantages and features of the invention are revealed in the following description of exemplary embodiments with reference to the figures.

FIG. 1A shows a detail of a B-pillar of a motor vehicle comprising an exemplary embodiment of an adjusting device according to the invention with a supporting element designed as a link chain for extending a belt guiding element which is located in FIG. 1A in a resting position.

FIG. 1B shows in a side view coinciding with FIG. 1A the adjusting device with—relative to FIG. 1A—the belt guiding subassembly adjusted upwardly and a belt guiding element arranged thereon in an extended state.

FIG. 2 shows in a side view and at an enlarged scale the belt guiding element with the end of the link chain fastened thereto.

DETAILED DESCRIPTION

Figure 3A:
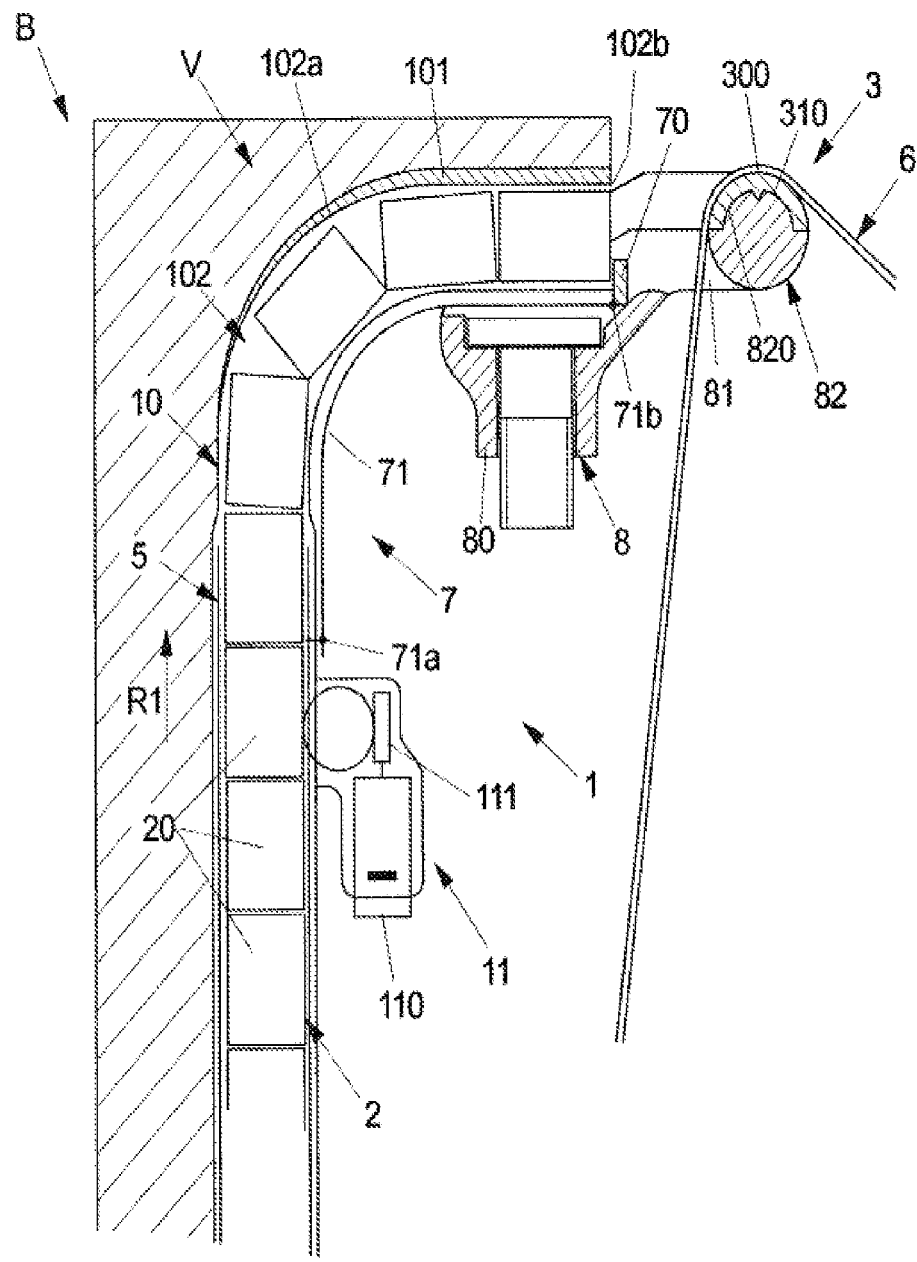
FIGS. 3A-3C show in different adjusting phases a further exemplary embodiment of an adjusting device according to the invention with a control mechanism, an adjusting force applied to the supporting element being able to be used thereby both for adjusting the belt guiding subassembly and for extending the belt guiding element.

An adjusting device V according to the invention which is accommodated on a B-pillar B of a motor vehicle is shown in FIGS. 1A and 1B. FIGS. 1A and 1B in this case show the B-pillar B in side view with a view of the vehicle interior and without the cladding conventionally fixed thereto.

The adjusting device V comprises a belt guiding subassembly 1 for a safety belt of a vehicle seat. A portion of the safety belt, which is not shown in FIGS. 1A and 1B for reasons of clarity, is guided along the B-pillar B via the belt guiding subassembly 1. The belt guiding subassembly 1 in this case comprises, in particular, an adjusting part 10 which is able to be adjusted in the longitudinal direction of extent of the B-pillar B, and a belt guiding element 12 fixed to the adjusting part at the upper end of the adjusting part 10. A belt outlet opening 120 is defined via the belt guiding element 12, the safety belt being guided through said belt outlet opening, from the inside of the hollow space of the B-pillar B covered by cladding. The adjusting part 10 in this case is displaceably mounted on a guide part 5, for example in the form of a guide rail, which is fixed to a vehicle part 4 of the B-pillar B fixed to the bodywork. The adjusting part 10, for example via a drive spindle not shown here, is longitudinally displaceable along the guide part 5, together with the first belt guiding element 12 fixed to the adjusting part and an extendable second belt guiding element 3. The second extendable belt guiding element 3 is arranged in front of the (first) belt guiding element 12 fixed to the adjusting part.

Whilst a belt height of the safety belt is able to be adjusted via the adjusting part 10 of the belt guiding subassembly 1 by adjusting in a direction of adjustment R1 extending substantially parallel to the longitudinal direction of extent of the B-pillar B, the extendable belt guiding element 3 is able to be adjusted substantially perpendicular thereto in a direction of extension R2 in order to facilitate the grasping of the safety belt by a vehicle occupant when fastening the safety belt. In the extended state of the belt guiding element 3, therefore, a portion of the safety belt extends between the belt guiding element 12 on the B-pillar B fixed to the adjusting part and the extended belt guiding element 3 displaced to the front. The safety belt is thus firstly deflected on the belt guiding element 12 fixed to the adjusting part in the direction of the extended belt guiding element 3 and secondly in the direction of a lower fastening point provided on the side of a vehicle seat.

For the extension and retraction of the belt guiding element 3 a supporting element in the form of a link chain 2 constructed from a plurality of chain links 20 and connected to the extendable belt guiding element 3 is adjustably mounted on the adjusting part 10. The link chain 2 is flexible per se via its individual chain links 20 and is fully received in a guide channel 102 of the adjusting part 10 when the belt guiding element 3 is retracted and is in the resting position shown in FIG. 1A. In the guide channel 102 the link chain 2 is deflected once by substantially 90°. In this manner, the link chain 2 extends in a retracted state inside a guide defined by the guide channel 102 proceeding from a rear chain end 2a, primarily along the longitudinal axis of the B-pillar B and via a deflection region 102a of the guide channel 102, in which the link chain 2 is deflected by substantially 90°, to a front chain end 2b which is present on an outlet opening 102b of the guide channel 102. The front chain end 2b is in this case defined by a chain member 20 which in the resting position of the belt guiding element 3 is in the outlet opening 102b and is connected to the belt guiding element 3.

By extending the link chain 2 out of the outlet opening 102b the belt guiding element 3 fixed thereto is adjusted and also extended—in the direction of a vehicle front. The individual chain links 20 of the link chain 2 in this case are pretensioned relative to one another such that the links of a chain portion extended from the outlet opening 102b are automatically fixed together by a positively locked and frictional connection and the chain portion is then sufficiently rigid in order to retain the belt guiding element 3 in an extended position. The extended chain portion in this case, in particular, is rigid transversely to the direction of extension R2 so that the belt guiding element 3 may be extended substantially along a horizontal line and the link chain 2 in this case does not bend or sag.

The pretensioning for automatically fixing the chain links 20 together, when the belt guiding element 3 is intended to be extended, is produced via a traction cable 21 and at least one spring element designed here as a compression spring 22. The individual chain links 20 are arranged in succession along the traction cable 21 and connected to the traction cable 21, for example by the traction cable 21 in each case being guided through a through-opening of the individual chain links 20. Thus the traction cable 21 extends through all of the individual chain links 20 which are movable relative to one another. One end of the traction cable in this case is fixed to the rear chain end 2a which always remains in the guide channel 102. The other traction cable end 210 is secured to a front chain link of the front chain end 2b, and the belt guiding element 3 being fixed thereto. The traction cable end 210 is in this case supported on the compression spring which holds the traction cable under tension and forces the two chain ends 2a and 2b toward one another. The compression spring 22 in this case is mounted in a channel-shaped hollow space or a channel-shaped recess of the final chain link 20 and supported in the longitudinal direction of the traction cable against a wall portion of this final chain link 20. By the spring force applied by the compression spring 22, therefore, the individual chain links 20 are pressed against one another but by the application of the spring force said chain links are also able to be released from one another again, so that the link chain 2 is sufficiently flexible in order to be deflected in the deflection region 102a of the guide channel 102.

The extension and retraction of the belt guiding element 3 in the present case is electronically controlled and undertaken by an electromotive drive 11. This drive 11 is mounted on the adjusting part 10. Via a drive pinion this drive 11 meshes with a toothed region which is formed on each chain link 20 (see FIG. 2). In this manner, the drive 11 is able to displace the link chain 2 along the guide channel 102 and adjust the belt guiding element 3 connected thereto.

The belt guiding element 3 in the present case comprises a deflection opening 30 which is designed in the shape of a banana and which defines a permanent deflection point for the safety belt. Via the belt guiding element 3, therefore, the safety belt in the present case is not only able to be moved into an advantageous forward displaced position for the vehicle occupant to grasp the safety belt, but is also retained thereon and guided when the vehicle occupant has fastened the safety belt. In this case, both a belt height and the height at which the belt guiding element 3 is intended to be extended is individually adjustable and is preferably able to be altered even when the belt guiding element 3 is extended.

The belt guiding element 3 additionally forms in the present case a cladding portion, the belt outlet opening 120 being partially covered thereby in the resting position of the retracted belt guiding element 3. The cladding portion of the belt guiding element 3, therefore, may be inserted for example into a cladding of the B-pillar B. As a result, the belt guiding element 3 in its resting position not only contributes to an aesthetically attractive overall appearance but also closes in a protective manner the outlet opening 120 of the belt guiding element 12 fixed to the adjusting part.

From FIG. 2 it may also be seen that the belt guiding element 3 in the present case is provided with a rib structure 31. Via the rib structure 31 the belt guiding element 3 is reinforced. Moreover, the belt guiding element 3 has a fastening portion 32 below the deflection opening 30. Via the fastening portion 32, the belt guiding element 3 is fixed to the front extendable end 2b of the link chain 2.

Figure 3B:
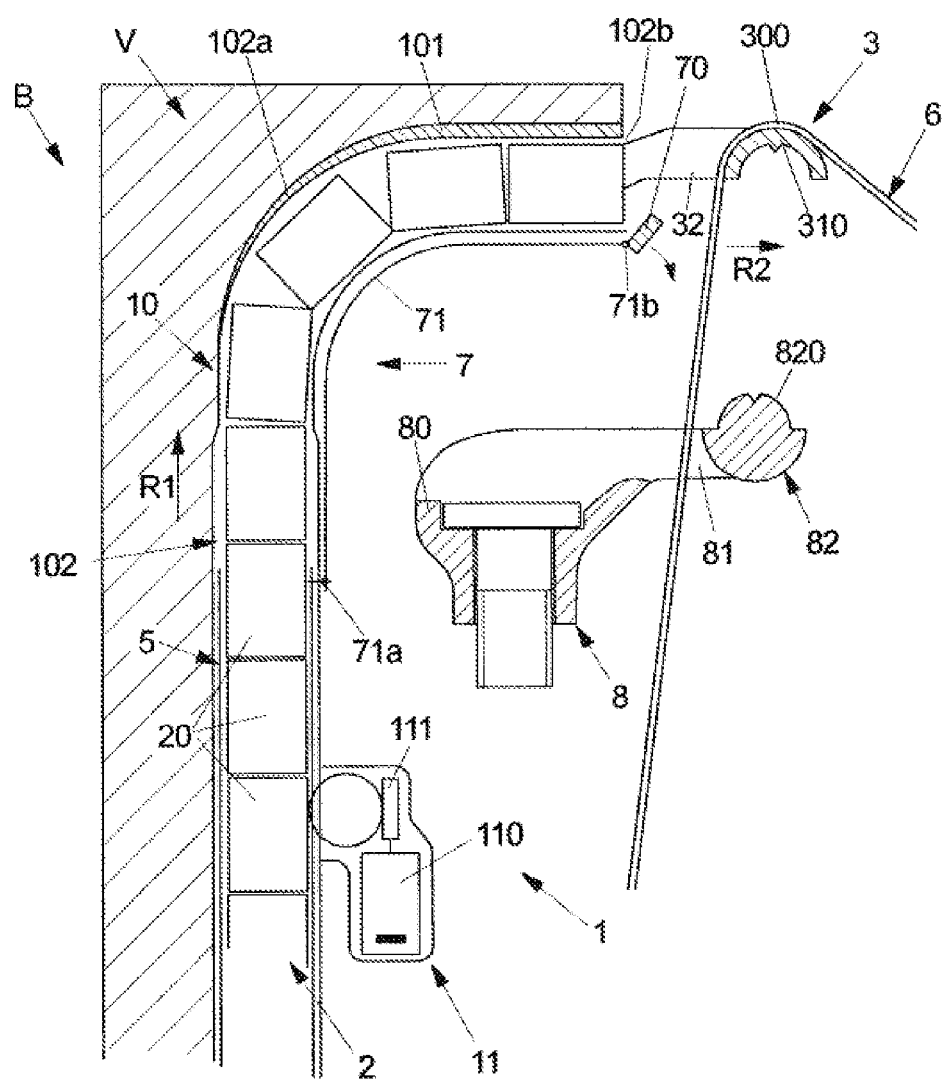
Figure 3C:
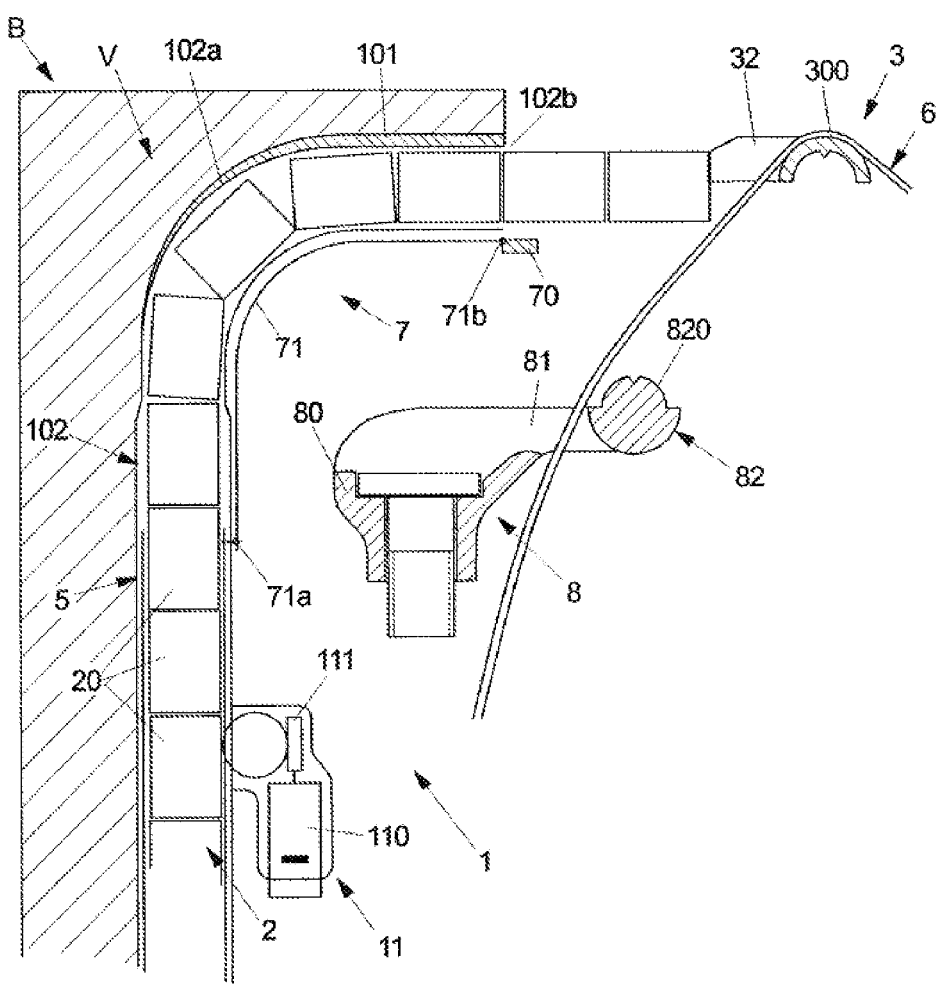

A further variant of an adjusting device V according to the invention is illustrated by FIGS. 3A, 3B and 3C. In this case, a supporting element in the form of a link chain 2 is provided once again in order to extend a belt guiding element 3 in a direction of extension R2. The link chain 2 is also arranged on an adjustable belt guiding subassembly 1 which is adjustable in the direction of adjustment R1 extending substantially perpendicular to the direction of extension R2. In the variant of FIGS. 3A to 3C, however, the adjusting part 10 which forms the guide channel 102 for the link chain 2 is designed to be able to be extended via the link chain 2 itself, as will be described hereinafter in more detail.

The adjusting part 10 in this case is displaceably mounted on the guide part 5 which is fixed to the cladding or bodywork and is thus stationary. The guide part 5 in this case may be configured as a guide rail, guide sleeve or guide tube, wherein the adjusting part is displaceably mounted in the direction of adjustment R1 along an inner or outer peripheral surface of the guide part 5. In the present case the guide part 5 in the retracted state of the link chain 2 also receives several chain links 20 whilst further chain links 20 and the extendable end of the link chain 2 are mounted in the adjusting part 10. The link chain 2 mounted in a retracted state with its extendable end inside the adjusting part 10, in the present case serves not only for extending the belt guiding element 3 connected thereto but also for displacing the adjusting part 10 relative to the guide part 5. Thus, the link chain 2 is locked via an adjustable stop 70, which is provided on or inside the adjusting part 10, against an adjustment relative to the adjusting part 10 in the direction of extension R2. In the variant of FIGS. 3A to 3C, the stop 70 is designed to be pivotable and provided in the region of the outlet opening 102b of the guide channel 102. In this case, even in the retracted state the link chain 2 is already deflected via the deflection region 102a in the guide channel 102 and bears with a chain link 20 in the region of the outlet opening 102b against the stop 70, when said stop is in a locked position illustrated in FIG. 3A.

If the link chain 2 is now driven to perform an adjusting movement via the drive 11 which is illustrated in FIGS. 3A to 3C by a motor 110 and a gear mechanism 111, the stop 70 located in its locked position prevents the extension of the link chain 2 from the adjusting part 10 in the direction of extension R2. Due to the displaceable mounting of the adjusting part 10 relative to the guide part 5, however, the link chain 2 now forces the adjusting part 10 in the direction of adjustment R1 and displaces said adjusting part relative to the guide part 5 in the direction of adjustment R1. The adjusting part 10 of the belt guiding subassembly 1 is, therefore, in the present case displaced via the link chain 2 substantially parallel to a vehicle vertical axis, in the manner of a telescopic drive. In this case, due to the fixing of the belt guiding element 3 to the link chain 2, the belt guiding element 3 is (upwardly) adjusted therewith in the direction of adjustment R1.

If the adjusting part 10 has reached a desired adjusting height and thus has traveled over a defined adjusting path in the direction of adjustment R1, the stop 70 is pivoted into a released position according to FIG. 3B, so that the one end of the link chain 2 is able to extend out of the adjusting part 10 at the outlet opening 102b. The stop 70 is in this case part of a control mechanism 7 which via the stop 70 controls the use of the adjusting force applied via the drive 11 onto the link chain 2, such that successive adjusting movements of the link chain 2 are implemented, on the one hand, together with the adjusting part 10 and, on the other hand, relative thereto.

To this end, the control mechanism further comprises a control traction means in the form of a control cable 71 which is fastened at one end via a fastening 71a to the guide part 5 and at its other end via a further fastening 71b to the stop 70. If the adjusting part 10 which is L-shaped in cross section is adjusted sufficiently relative to the guide part 5, the control cable 71 is tensioned sufficiently for an adjusting force exerted thereby onto the stop 70 to exceed a restoring force of a restoring spring acting on the stop 70, which pretensions the stop 70 in its locked position. The control cable 71, therefore, pulls the stop 70 into its released position and pivots the stop counter to the restoring force of the restoring spring, so that the outlet opening 102b is no longer blocked by the stop 70. If the stop 70 according to FIG. 3C is in its released position, the link chain 2 driven further by the drive 11 is forced out of the adjusting part 10—optionally locked via a further stop against a further adjustment in the direction of adjustment R1. As a result, the belt guiding element 3 moves in the direction of extension R2 so that the grasping of a safety belt is facilitated, a belt strap 6 thereof being shown in FIGS. 3A to 3C.

The belt strap 6 is deflected on the belt guiding element 3 on a belt guiding surface 300, which is curved in a convex manner, and is always retained in a defined position thereby. In contrast to the variant of FIGS. 1A-1B and 2, the belt guiding element 3 in this case also has at least one positively locked connecting region 310 via which the belt guiding element 3 in its resting position is positively blocked on an immovably fixed fastening part 8. The positively locked connecting region 310 is in this case provided on a lower face of the belt guiding element 3 opposing the belt guiding surface 300, so that the belt guiding element 3 in its resting position is able to be blocked thereby, but with an adjustment of the belt guiding subassembly 1 in the direction of adjustment R1 is raised by the fastening part 8 and thereby the positively locked connection may be easily released.

The fastening part 8 is preferably fixed in the region of the B-pillar B via a fixing portion 80. This fixing portion 80 has, for example, a fastening opening for a fastening element, such as for example a rivet, a bolt or a screw. A connecting arm 81 is provided on the fixing portion 80, said connecting arm connecting the fixing portion 80 to a retaining portion 82 of the fastening part 80. A positively locked connecting region 820 which is complementary to the positively locked connecting region 310 of the belt guiding element 3 is provided on the retaining portion 82. If the belt guiding element 3 according to FIG. 3A is in its resting position, the two positively locked connecting regions 310 and 820 are in engagement with one another so that the belt guiding element 3 is blocked and supported on the fastening part 8.

Due to the positively locked connection with the fastening part 8, the belt guiding element 3 in its resting position is able to be adjusted exclusively in the direction of adjustment R1 together with the belt guiding subassembly 1. If the adjusting part 10 is displaced upwardly via the link chain 2, the engagement of the positively locked connecting region 310 of the belt guiding element 3 with the positively locked connecting region 820 of the fastening part 8 is released and the belt guiding element 3 is spaced apart from the fastening part 8 and the retaining portion 82 thereof. In this manner, the belt guiding element 3 is no longer prevented by the fastening part 8 from an adjustment in the direction of extension R2, when the adjusting part 10 according to FIGS. 3B and 3C has been adjusted (upwardly) in the direction of adjustment R1. At the same time, however, in the resting position of the belt guiding element 3 an additional securing and support of the belt guiding element 3 is provided via the fastening element 8.

The adjusting part 10, in particular in a variant according to FIGS. 3A to 3C, is provided in the region of the outlet opening 102b with a cover 101 so that one end of the adjusting part 10, on which the link chain 2 is able to be extended, may be present visibly on the cladding of the B-pillar B. Preferably, in this case the adjustably mounted stop 70 is also covered by the cover 101 as is the control cable 71. The control cable 71 may also be displaced along the adjusting part 10 and, in particular, the outer face of the guide channel 102 via at least one guide channel or one or more guide eyes and/or via one or more guide projections.

LIST OF REFERENCE NUMERALS

1 Belt guiding subassembly
10 Adjusting part
101 Cover
102 Guide channel (guide)
102a Deflection region
102b Outlet opening
11 Drive
110 Motor
111 Gear mechanism
12 Belt guiding element (fixed to the adjusting part)
120 Belt outlet opening
2 Link chain (supporting element)
20 Chain link
21 Traction cable
210 Traction cable end
22 Compression spring (spring element)
2a, 2b Chain end
3 Belt guiding element
30 Deflection opening
300 Belt guiding surface
31 Rib structure
310 Positively locked connecting region
32 Fastening portion
4 Vehicle part
5 Guide part 6 Belt strap
7 Control mechanism
70 Stop
71 Control cable (control traction means)
71a, 71b Fastening
8 Fastening part
80 Fixing portion
81 Connecting arm
82 Retaining portion
820 Positively locked connecting region
B B-pillar
R1 Direction of adjustment
R2 Direction of extension
V Adjusting device

The invention claimed is:

1. An adjusting device for a safety belt in a vehicle, the adjusting device comprising at least one extendable belt guiding element which is provided for guiding a portion of the safety belt and at least one supporting element which is connected to the belt guiding element and which is able to be at least partially extended together with the belt guiding element, wherein;
   the belt guiding element is able to be extended from a resting position in a direction of extension in order to facilitate the grasping of the safety belt by a vehicle occupant when fastening the safety belt;
   the supporting element is flexible, but in the extended state the belt guiding element is sufficiently rigid in at least in portion traverse to a direction of extension such that the belt guiding element is held in an extended position via the now rigid portion of the supporting element;
   the belt guiding element is mounted so as to be extendable on an adjustable belt guiding subassembly which is able to be adjusted in a direction of adjustment which is different from the direction of extension of the belt guiding element and the supporting element being deflected thereon at least once when the belt guiding element is in its resting position, and
   the belt guiding element forms a cladding portion, an outlet opening for the safety belt being at least partially covered thereby when the belt guiding element is in its resting position.

2. The adjusting device as claimed in claim 1, wherein via an adjusted position of the belt guiding subassembly the position of a deflection point for the safety belt is able to be adjusted, the safety belt extending from said deflection point in the direction of the shoulder of a vehicle occupant who is fastened in by the safety belt.

3. The adjusting device as claimed in claim 1, wherein the belt guiding element is provided for guiding a portion of the safety belt in the region of a shoulder of a vehicle occupant fastened in by the safety belt.

4. The adjusting device as claimed in claim 1, wherein the flexible supporting element is deflected on the belt guiding subassembly at least once by at least 60°.

5. The adjusting device as claimed in claim 1, wherein the flexible supporting element is mounted on a guide of the belt guiding subassembly so as to be extendable, such that the supporting element protrudes from an outlet opening of the guide at least with a now rigid portion when the belt guiding element is extended.

6. The adjusting device as claimed in claim 1, wherein a drive is provided, the extension of the belt guiding element and/or the adjustment of the adjustable belt guiding subassembly, on which the belt guiding element is mounted so as to be extendable, being able to take place by an externally applied force.

7. An adjusting device for a safety belt in a vehicle, the adjusting device comprising at least one extendable belt guiding element which is provided for guiding a portion of the safety belt and at least one supporting element which is connected to the belt guiding element and which is able to be at least partially extended together with the belt guiding element, wherein;
   the belt guiding element is able to be extended from a resting position in a direction of extension in order to facilitate the grasping of the safety belt by a vehicle occupant when fastening the safety belt;
   the supporting element is flexible, but in the extended state the belt guiding element is sufficiently rigid in at least in portion transverse to a direction of extension such that the belt guiding element is held in an extended position via the now rigid portion of the supporting element;
   the belt guiding element is mounted so as to be extendable on an adjustable belt guiding subassembly which is able to be adjusted in a direction of adjustment which is different from the direction of extension of the belt guiding element and the supporting element being deflected thereon at least once when the belt guiding element is in its resting position;
   wherein the supporting element comprises a chain which is flexible, but in the extended state of the belt guiding element is rigid due to links of the chain connected together,
   wherein the links of the chain are pretensioned relative to one another such that links of the chain in the extended state of the belt guiding element are fixed together in a rigid chain portion transverse to the direction of extension, the belt guiding element is held in an extended position; and
   wherein when adjusting the belt guiding element into its resting position, a fixing of the links together is able to be released so that the previously rigid chain portion becomes flexible again.

8. The adjusting device as claimed in claim 7, wherein at least one magnet and/or an elongated traction means is provided for fixing the links together.

9. The adjusting device as claimed in claim 8, wherein one end of the at least one traction means is connected to the belt guiding element or a link of the chain fixed thereto and the traction means extends along the links of the chain.

* * * * *